(12) United States Patent
Sun et al.

(10) Patent No.: US 11,685,870 B2
(45) Date of Patent: Jun. 27, 2023

(54) INTEGRATED PROCESS WITH A DEPOLYAROMATIZATION COLUMN FOR THE PRODUCTION OF BENZENE, TOLUENE AND XYLENES FROM PYROLYSIS FUEL OIL STREAM

(71) Applicant: Saudi Arabian Oil Company, Dhahran (SA)

(72) Inventors: Miao Sun, Dhahran (SA); Zhonglin Zhang, Dhahran (SA); Sohel K. Shaikh, Dhahran (SA); Omer Koseoglu, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 17/683,575

(22) Filed: Mar. 1, 2022

(65) Prior Publication Data
US 2022/0275297 A1    Sep. 1, 2022

Related U.S. Application Data

(60) Provisional application No. 63/154,882, filed on Mar. 1, 2021.

(51) Int. Cl.
*C10G 69/06* (2006.01)
*C10G 55/04* (2006.01)
(Continued)

(52) U.S. Cl.
CPC ........... *C10G 69/06* (2013.01); *C10G 25/003* (2013.01); *C10G 55/04* (2013.01); *C10G 67/06* (2013.01);
(Continued)

(58) Field of Classification Search
CPC ...... C10G 25/003; C10G 55/04; C10G 67/07; C10G 69/06
See application file for complete search history.

(56) References Cited

U.S. PATENT DOCUMENTS 2,101,308 A    12/1937  Bray et al.
2,337,448 A    12/1943  Carr
(Continued)

OTHER PUBLICATIONS

Notification of Transmittal of the International Search Report and the Written Opinion of the International Searching Authority, or the Declaration dated May 20, 2022 pertaining to International application No. PCT/US2022/017439 filed Feb. 23, 2022, pp. 1-14.

*Primary Examiner* — Renee Robinson
(74) *Attorney, Agent, or Firm* — Dinsmore & Shohl LLP

(57) ABSTRACT

A catalytic upgrading process includes introducing a feed comprising crude oil to a steam cracking unit, thereby producing pyrolysis fuel oil (PFO). The PFO is introduced to a first catalytic depolyaromatization reactor to remove polyaromatics from the feed, thereby producing polyaromatics adsorbed to the catalyst and depolyaromatized PFO. The depolyaromatized PFO is introduced to a hydrocracking unit. The resulting benzene-toluene-xylenes (BTX) and liquid petroleum gas (LPG) are separated, and the BTX is introduced to a BTX complex to produce refined BTX. The LPG can then be introduced to the steam cracking unit. After depolyaromatization, a wash solvent is introduced into the first catalytic depolyaromatization reactor to remove the polyaromatics, regenerate the catalyst, and produce a mixture comprising the wash solvent and the polyaromatics. The wash solvent is separated from the polyaromatics.

19 Claims, 3 Drawing Sheets

(51) Int. Cl.
    *C10G 67/06*     (2006.01)
    *C10G 69/12*     (2006.01)
    *C10G 25/00*     (2006.01)

(52) U.S. Cl.
    CPC ....... *C10G 69/126* (2013.01); *C10G 2400/30* (2013.01)

(56) References Cited

U.S. PATENT DOCUMENTS

| | | |
|---|---|---|
| 2,367,671 A | 1/1945 | Dickinson et al. |
| 2,850,431 A | 9/1958 | Smith |
| 2,940,920 A | 6/1960 | Garwin |
| 3,159,571 A | 12/1964 | Reman et al. |
| 3,364,138 A | 1/1968 | Campagne et al. |
| 4,101,415 A | 7/1978 | Crowley |
| 4,290,880 A | 9/1981 | Leonard |
| 4,548,711 A | 10/1985 | Coombs et al. |
| 7,790,646 B2 | 9/2010 | Lopez et al. |
| 10,308,880 B2 | 6/2019 | Sun et al. |
| 10,465,131 B2 | 11/2019 | Oprins |
| 10,676,681 B2 | 6/2020 | Ward et al. |
| 2013/0264247 A1 | 10/2013 | Cardenas et al. |
| 2018/0187099 A1* | 7/2018 | Bourane ................ C10G 45/00 |
| 2019/0055476 A1 | 2/2019 | Sun et al. |
| 2020/0102507 A1 | 4/2020 | Sun et al. |
| 2021/0001320 A1 | 1/2021 | Sun |

* cited by examiner

INTEGRATED PROCESS WITH A DEPOLYAROMATIZATION COLUMN FOR THE PRODUCTION OF BENZENE, TOLUENE AND XYLENES FROM PYROLYSIS FUEL OIL STREAM

CROSS-REFERENCE TO RELATED APPLICATION

This application claims priority to U.S. Non-Provisional Patent Application Ser. No. 63/154,882, filed on Mar. 1, 2021, the entire contents of which is incorporated by reference into the present disclosure.

FIELD

Embodiments of the present disclosure generally relate to refining hydrocarbon oil, and pertain particularly to a catalytic upgrading process for producing petrochemical substances, such as benzene-toluene-xylenes (BTX), from a crude oil stream while removing polyaromatics.

TECHNICAL BACKGROUND

Polyaromatics are the heaviest and most polar compounds naturally occurring in crude oil, which typically includes polyaromatics in concentrations ranging from 1% by weight to 17% by weight, and they are also identified as a major factor in causing difficulties during crude oil transportation and refining. Polyaromatics are one of the four main substances believed to be soluble in crude oils at atmospheric pressure and ambient temperature, the others being saturates, aromatics, and resins. However, unlike resins, polyaromatics contain highly polar species that tend to associate, and as a result, the interactions of polyaromatics with the environment are very complex.

Polyaromatics are a mixture of high molecular weight polycyclic aromatic hydrocarbons and heterocyclic compounds, primarily comprising carbon, hydrogen, nitrogen, oxygen, and sulfur, as well as trace amounts of vanadium and nickel. In polyaromatics, the hydrogen-to-carbon atomic ratio is approximately 1.2:1.0. Polyaromatics are defined operationally as n-pentane or n-heptane-insoluble, toluene-soluble components of a carbonaceous material such as crude oil, and are a sticky, black, highly viscous residue of distillation processes.

All aspects of crude oil production and refining may be negatively impacted by polyaromatics. For example, polyaromatics precipitation or deposition can occur in wellbores, pipelines, and surface facilities, limiting well productivity and fluid flow. Further, polyaromatics may poison the refining catalysts or may clog the refining system, causing damage and lost productivity for oil refineries.

Conventional polyaromatics separation, which may utilize Solvent Depolyaromatization (SDPA) technology, involves applying paraffinic solvents (n-propane, n-butane, n-pentane, n-hexane, or n-heptane) to perform liquid-liquid extraction, to produce higher-value Depolyaromatized Oil (DAO). However, the SDPA process requires a considerable amount of expensive paraffinic solvents (the solvent to crude oil ratio is typically from 2:1 to 10:1 by volume). Furthermore, the separation and recovery of paraffinic solvents from DAO are energy-intensive processes.

SUMMARY

There is a continual need for novel processes for removing polyaromatics from crude oil streams while converting the crude oil streams to valuable building block chemicals. Embodiments of the present disclosure are directed to a catalytic upgrading process focused on addressing this need.

According to an embodiment, a catalytic upgrading process for producing petrochemical substances from a crude hydrocarbon stream may include a first catalytic depolyaromatization reactor downstream of a steam cracking unit. The first catalytic depolyaromatization reactor may include a catalyst having a solid heteropolyacid compound. The process may include introducing a feed comprising crude oil to the steam cracking unit, thereby producing pyrolysis fuel oil. Additionally, the process may include introducing the pyrolysis fuel oil to the first catalytic depolyaromatization reactor to remove polyaromatics from the feed, thereby producing polyaromatics adsorbed to the catalyst and depolyaromatized pyrolysis fuel oil having a reduced concentration of polyaromatics. The depolymerized pyrolysis fuel oil may be introduced to a hydrocracking unit, thereby producing a BTX-rich stream and liquid petroleum gas, which may then be separated. The liquid petroleum gas may be introduced to the steam cracking unit, and a wash solvent may be introduced to the first catalytic depolyaromatization reactor after depolyaromatization to remove the polyaromatics. The catalyst in the first catalytic depolyaromatization reactor may thus be regenerated, and a mixture comprising the wash solvent and the polyaromatics may be produced. The wash solvent may be separated from the polyaromatics.

Additional features and advantages of the embodiments described herein will be set forth in the detailed description which follows, and in part will be readily apparent to those skilled in the art from that description or recognized by practicing the embodiments described, including the detailed description and the claims which are provided infra.

BRIEF DESCRIPTION OF THE DRAWINGS

The following detailed description of specific embodiments of the present disclosure can be best understood when read in conjunction with the following drawings in which.

DETAILED DESCRIPTION

Figure 1:
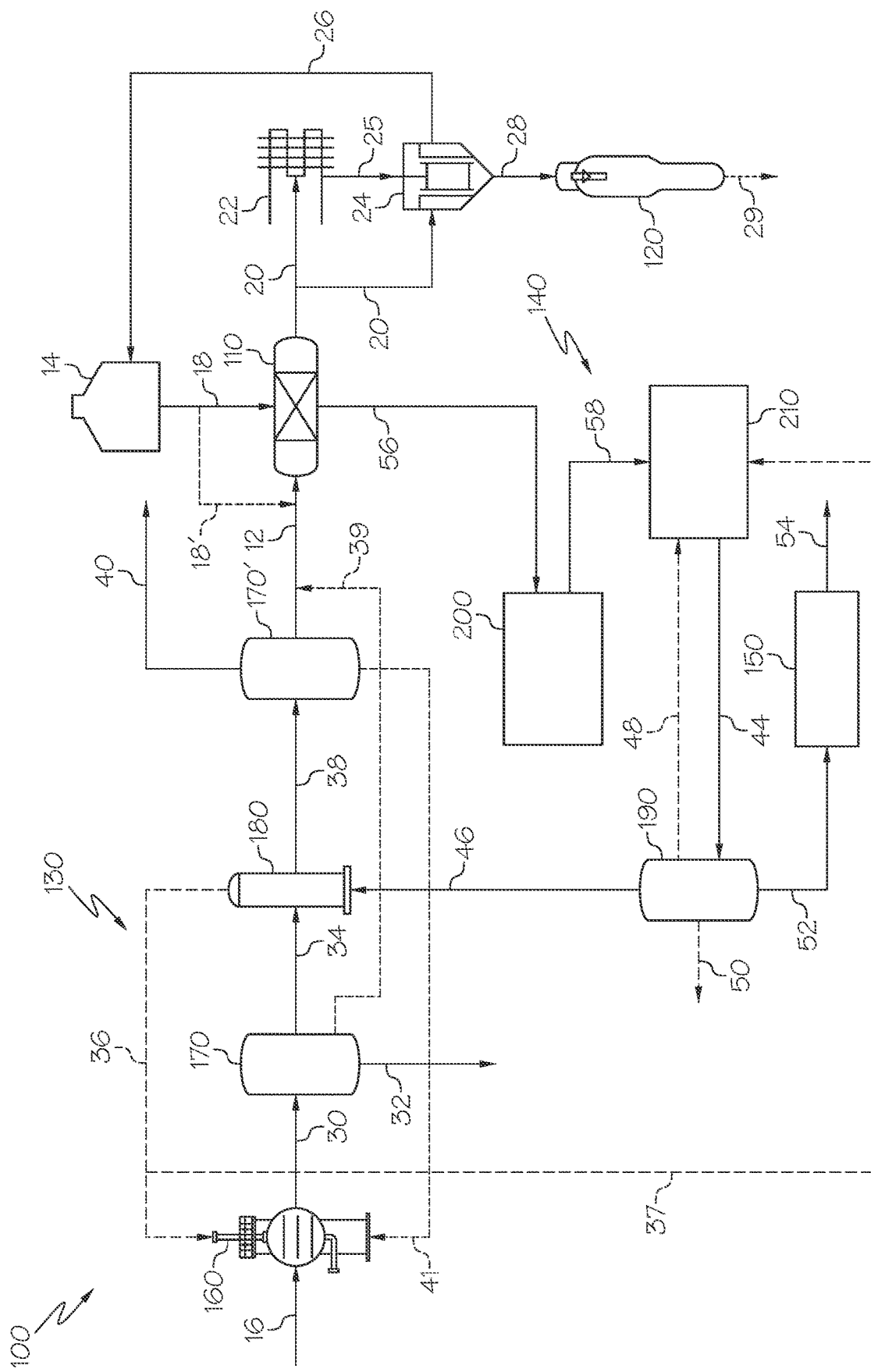
FIG. 1 depicts a catalytic upgrading process with in situ polyaromatics removal, in accordance with embodiments described herein.

As used herein, the term "hydrocarbon oil" or "hydrocarbon feedstock" refers to an oily liquid composed mostly of a mixture of hydrocarbon compounds. Hydrocarbon oil may include refined oil obtained from crude oil, synthetic crude oil, bitumen, oil sand, shale oil, or coal oil. The term "refined oil" includes, but is not limited to, vacuum gas oil (VGO), depolyaromatized oil (DAO) or demetallized oil (DMO) obtained from a depolyaromatization process, light and/or heavy coker gas oil obtained from a coking process, cycle oils obtained from an FCC process, and gas oil obtained from a visbreaking process.

As used herein, the term "hydrocarbon" refers to a chemical compound composed entirely of carbon and hydrogen atoms. An expression such as "$C_x$-$C_y$ hydrocarbon" refers to a hydrocarbon having from x to y carbon atoms. For instance, a $C_1$-$C_5$ hydrocarbon includes methane, ethane, propane, the butanes, and the pentanes.

As used herein, the term "polyaromatics" refers to chemical compounds composed of four or more aromatic rings. Polyaromatics having fewer than seven aromatic rings are typically referred to as "polynuclear aromatics" ("PNA"), and polyaromatics having seven to ten aromatic rings are typically referred to as "heavy polynuclear aromatics" ("HPNA").

As used herein, the term "hydrogen/oil ratio" or "hydrogen-to-oil ratio" or "hydrogen-to-hydrocarbon ratio" refers to a standard measure of the volume rate of hydrogen circulating through the reactor with respect to the volume of feed. The hydrogen/oil ratio may be determined by comparing the flow volume of the hydrogen gas stream and the flow volume of the hydrocarbon feed.

As used herein, the term "liquid hourly space velocity" or "LHSV" refers to the ratio of the liquid flow rate of the hydrocarbon feed to the catalyst volume.

As used herein, the term "conduit" includes casings, liners, pipes, tubes, coiled tubing, and mechanical structures with interior voids.

As used herein, the term "decreased content" of a substance means that a concentration of the substance is greater before passing through a stage of the process under examination than it is after passing through the stage. As used herein, the term "increased content" of a substance means that a concentration of the substance is greater after passing through a stage of the process under examination than it is before passing through the stage.

According to one aspect, a catalytic upgrading process for producing petrochemical substances from a crude oil stream includes introducing a feed comprising crude oil to a steam cracking unit, thereby producing pyrolysis gasoline (PG) and pyrolysis fuel oil (PFO). As used herein, the term "pyrolysis gasoline" refers to $C_5$-$C_{13}$ hydrocarbons, and the term "pyrolysis fuel oil" refers to hydrocarbons with carbon number 12 and above and comprising a fused ring system having up to 10 rings. The PFO may then be introduced to a depolyaromatization reactor to remove polyaromatics from the feed. The depolyaromatization produces polyaromatics adsorbed to the catalyst and depolyaromatized PFO having a reduced concentration of polyaromatics. The process also includes introducing depolyaromatized PFO to a hydrocracking unit, which produces benzene-toluene-xylenes (BTX) and liquid petroleum gas (LPG). The process further includes separating the BTX from the LPG and introducing the BTX to a BTX complex to produce refined BTX. The LPG may be introduced to the steam cracking unit. After depolyaromatization, a wash solvent is introduced to the first catalytic depolyaromatization reactor to remove the polyaromatics, thereby regenerating the catalyst in the first catalytic depolyaromatization reactor and producing a mixture comprising the wash solvent and the polyaromatics. The wash solvent is separated from the polyaromatics.

In embodiments, the process includes introducing the PFO and non-paraffinic solvent to the first catalytic depolyaromatization reactor, resulting in depolyaromatized PFO and polyaromatics. Non-paraffinic solvents include, but are not limited to, an aromatic hydrocarbon solvent, such as benzene, toluene, xylene, and mixtures thereof. It is envisioned that more than one catalytic depolyaromatization reactor, such as a first catalytic depolyaromatization reactor and a second catalytic depolyaromatization reactor, may be used in the process. While the depolyaromatization is performed in the first catalytic depolyaromatization reactor (which is thus in the reaction mode), non-paraffinic solvent may be added to a second catalytic depolyaromatization reactor to regenerate the catalyst of the second catalytic depolyaromatization reactor (which is thus in the regeneration mode). The non-paraffinic solvent used for catalyst regeneration may be, but need not be, the same non-paraffinic solvent combined with the crude oil before introducing the mixture to the first catalytic depolyaromatization reactor. As used herein, "non-paraffinic solvent" and "wash solvent" are synonymous. After the catalyst of the second catalytic depolyaromatization reactor is regenerated by washing away the polyaromatics contained therein, the second catalytic depolyaromatization reactor may become the reactor used for depolyaromatization the PFO and the catalyst of the first catalytic depolyaromatization reactor is regenerated by washing away the polyaromatics contained therein. Stated differently, after the catalyst of the second catalytic depolyaromatization reactor is regenerated, the first catalytic depolyaromatization reactor may be switched to regeneration mode and the second catalytic depolyaromatization reactor may be switched to reaction mode. This cycle of reaction mode and regeneration mode may be repeated continuously as necessary for processing a given quantity of PFO.

When more than two catalytic depolyaromatization reactors are used, such as when three catalytic depolyaromatization reactors are used, any desired number of the catalytic depolyaromatization reactors may be in reaction mode and any desired number of the catalytic depolyaromatization reactors may be in regeneration mode. For example, when three catalytic depolyaromatization reactors are used, the PFO may be introduced to the first and third catalytic depolyaromatization reactors for depolyaromatization while the non-paraffinic solvent without the PFO may be added to the second catalytic depolyaromatization reactor for catalyst regeneration.

In embodiments, each catalytic depolyaromatization reactor may be charged with a catalyst composition having a solid heteropolyacid compound. In embodiments, the solid heteropolyacid compound may be selected from the group consisting of Keggin-type heteropolyacids, cesium substituted heteropolyacids, and combinations thereof. Exemplary Keggin-type heteropolyacids include, but are not limited to, phosphortungstic heteropolyacid ($H_3PW_{12}O_{40}$), phosphormolybdic heteropolyacid ($H_3PMo_{12}O_{40}$), silicotungstic heteropolyacid ($H_4SiW_{12}O_{40}$), silicomolybdic heteropolyacid ($H_4SiMo_{12}O_{40}$), and combinations thereof. Exemplary cesium substituted heteropolyacids include, but are not limited to, $Cs_xH_yPMo_{12}O_{40}$, where $0<x<4$ and y equals 3-x; $Cs_xH_yPW_{12}O_{40}$, where $0<x<4$ and y equals 4-x; $Cs_xH_ySiMo_{12}O_{40}$, where $0<x<4$ and y equals 3-x; $Cs_xH_ySiW_{12}O_{40}$, where $0<x<4$ and y equals 4-x; and combinations thereof. In embodiments, the active catalyst component may be mixed with a binder to form catalyst pellets, extrudates, spheres, or a combination of two or more thereof. In embodiments, the extrudates may be from particles having cylindrical shape, trilobe shape, quadralobe shape, spherical shape, or a combination of two or more thereof. In embodiments, the binder may be alumina, silica-alumina, titania, silica, or combination of two or more thereof. The catalyst composition may be in the form of particles having an average particle size from 1 mm to 5 mm, such as from 1.5 mm to 5 mm, from 2 mm to 5 mm, from 2.5 mm to 5 mm, from 3 mm to 5 mm, from 1 mm to 4.5 mm, from 1 mm to 4 mm, from 1 mm to 3.5 mm, or even from 1 mm to 3 mm.

In embodiments, each of the catalytic depolyaromatization reactors in reaction mode is heated at a temperature from 20° C. to 100° C., from 20° C. to 95° C., from 20° C. to 90° C., from 20° C. to 85° C., from 20° C. to 80° C., from 20° C. to 75° C., from 20° C. to 70° C., from 20° C. to 65° C., from 25° C. to 100° C., from 30° C. to 100° C., from 35° C. to 100° C., from 40° C. to 100° C., from 45° C. to 100° C., from 50° C. to 100° C., from 55° C. to 100° C., or even from 60° C. to 100° C. It should be understood that the temperature of the catalytic depolyaromatization reactor may be in a range formed from any of the lower bounds of such a temperature described herein to any of the upper bounds of such a temperature described herein.

In embodiments, the pressure within each of the catalytic depolyaromatization reactors may be above atmospheric in reaction mode as the reactor is heated toward the reaction temperature. For instance, the pressure may be from 0.1 MPa (1 bar) to 0.5 MPa (5 bar), from 0.1 MPa (1 bar) to 0.4 MPa (4 bar), from 0.1 MPa (1 bar) to 0.3 MPa (3 bar), from 0.1 MPa (1 bar) to 0.2 MPa (2 bar), from 0.2 MPa (2 bar) to 0.5 MPa (5 bar), from 0.3 MPa (3 bar) to 0.5 MPa (5 bar), or even from 0.4 MPa (4 bar) to 0.5 MPa (5 bar). It should be understood that the pressure within each of the catalytic depolyaromatization reactors in reaction mode may be in a range formed from any of the lower bounds of such a pressure described herein to any of the upper bounds of such a pressure described herein.

A mixture of wash solvent and polyaromatics is produced when the catalytic depolyaromatization reactor is in regeneration mode. This mixture may be passed to a separation system downstream of the catalytic depolyaromatization reactor(s) to separate the wash solvent from the polyaromatics. The separation system may separate the wash solvent from the polyaromatics, and the wash solvent may be recycled back to the depolyaromatization reactor(s) for removal of additional polyaromatics. The separation system may include one or more flash drum, one or more distillation tower, one or more stripper with the required heat exchangers, one or more pumps, and other process equipment. One non-limiting example of a separator is an evaporation system in which the wash solvent is distilled-off, leaving a residue of polyaromatics. In embodiments, the evaporated wash solvent may be heat exchanged in a heat exchanger. For instance, a cooler may be used to cool the evaporated wash solvent. The cooled wash solvent may then be recycled into the catalytic upgrading process. Other methods of separating the wash solvent from the polyaromatics are envisioned, and some of these other methods may not require the cooler for cooling the wash solvent. In embodiments, the process further includes heating the catalytic depolyaromatization reactor in the regeneration mode under a reduced pressure after introducing the wash solvent to remove at least 90% by weight of the wash solvent.

As a result of the catalytic upgrading process, the depolyaromatized PFO has a reduced concentration of polyaromatics, such as less than 50% by weight polyaromatics. For example, the produced depolyaromatized PFO may have a reduced concentration of polyaromatics of from 1% by weight to 50% by weight, from 1% to 45%, from 1% to 40%, from 1% to 35%, from 1% to 30%, from 1% to 25%, from 1% to 20%, from 1% to 15%, from 1% to 10%, from 1% to 9%, from 1% to 8%, from 1% to 7%, from 1% to 6%, from 1% to 5%, from 1% to 4%, from 1% to 3%, from 1% to 2%, from 2% to 50%, from 3% to 50%, from 4% to 50%, from 5% to 50%, from 6% to 50%, from 7% to 50%, from 8% to 50%, from 9% to 50%, from 10% to 50%, from 15% to 50%, 20% to 50%, from 25% to 50%, from 30% to 50%, from 35% to 50%, from 40% to 50%, or even from 45% to 50%. It should be understood that the depolyaromatized PFO may have a reduced concentration of polyaromatics in a range formed from any lower bound for such a range described herein to any upper bound for such a range described herein. The depolyaromatized PFO exiting the catalytic depolyaromatization process has a lower viscosity and less toxic elements (e.g., S and N) relative to the PFO entering the catalytic depolyaromatization process.

The resulting depolyaromatized PFO may then be converted to BTX and LPG in a hydrocracking unit. A BTX Complex can then be used to further refine the BTX. Further details of the process described above will be provided with reference to the appended figures.

Referring now to FIG. 1, a process flow diagram of a catalytic upgrading process with in situ polyaromatics removal is shown. Apparatus 100 includes a catalytic depolyaromatization reactor 110, an optional residue disposal unit 120, a steam cracking unit 130, a selective hydrogenation hydrocracking unit 140, and a BTX complex 150.

In operation, a feed comprising crude oil is fed into steam cracking unit 130 via conduit 16. The steam cracking unit 130 may include various components, such as those shown in FIG. 1, i.e. the hydrotreating reactor 160, one or more separation zones 170, 170', and steam cracker 180.

In embodiments, the feed comprising crude oil is fed directly to the hydrotreating reactor 160, which removes nitrogen, sulfur, and metals (e.g., Ni and V) from the crude oil by hydrodemetallization, hydrodenitrogenation, and hydrodesulfurization conducted by passing the crude oil over a bed of catalyst at an elevated temperature and elevated pressure. For instance, the catalyst may include a metal selected from cobalt, tungsten, nickel, molybdenum, or some combination of these, on a support, such as alumina or silica. As used in this context, an "elevated temperature" includes a temperature from 350° C. to 450° C., from 350° C. to 440° C., from 350° C. to 430° C., from 350° C. to 420° C., from 350° C. to 410° C., from 350° C. to 400° C., from 350° C. to 390° C., from 350° C. to 380° C., from 350° C. to 370° C., from 350° C. to 360° C., from 360° C. to 450° C., from 370° C. to 450° C., from 380° C. to 450° C., from 390° C. to 450° C., from 400° C. to 450° C., from 410° C. to 450° C., from 420° C. to 450° C., from 430° C. to 450° C., or even from 440° C. to 450° C. As used in this context, an "elevated pressure" includes a pressure from 1 MPa to 20 MPa, from 1 MPa to 19 MPa, from 1 MPa to 18 MPa, from 1 MPa to 17 MPa, from 1 MPa to 16 MPa, from 1 MPa to 15 MPa, from 1 MPa to 14 MPa, from 1 MPa to 13 MPa, from 1 MPa to 12 MPa, from 1 MPa to 11 MPa, from 1 MPa to 10 MPa, from 1 MPa to 9 MPa, from 1 MPa to 8 MPa, from 1 MPa to 7 MPa, from 1 MPa to 6 MPa, from 1 MPa to 5 MPa, from 1 MPa to 4 MPa, from 1 MPa to 3 MPa, from 1 MPa to 2 MPa, from 2 MPa to 20 MPa, from 3 MPa to 20 MPa, from 4 MPa to 20 MPa, from 5 MPa to 20 MPa, from 6 MPa to 20 MPa, from 7 MPa to 20 MPa, from 8 MPa to 20 MPa, from 9 MPa to 20 MPa, from 10 MPa to 20 MPa, from 11 MPa to 20 MPa, from 12 MPa to 20 MPa, from 13 MPa to 20 MPa, from 14 MPa to 20 MPa, from 15 MPa to 20 MPa, from 16 MPa to 20 MPa, from 17 MPa to 20 MPa, from 18 MPa to 20 MPa, or even from 19 MPa to 20 MPa. The LHSV within hydrotreating reactor 160 may be from $0.25\ h^{-1}$ to $2\ h^{-1}$, from $0.5\ h^{-1}$ to $2\ h^{-1}$, from $0.75\ h^{-1}$ to $2\ h^{-1}$, from $1\ h^{-1}$ to $2\ h^{-1}$, from $1.25\ h^{-1}$ to $2\ h^{-1}$, from $1.5\ h^{-1}$ to $2\ h^{-1}$, from $0.25\ h^{-1}$ to $1.75\ h^{-1}$, from $0.25\ h^{-1}$ to $1.5\ h^{-1}$, from $0.25\ h^{-1}$ to $1.25\ h^{-1}$, from $0.25\ h^{-1}$ to $1\ h^{-1}$, or even from $0.25\ h^{-1}$ to $0.75\ h^{-1}$.

Denitrogenated and desulfurized crude oil exits the hydrotreating reactor 160 and is passed to a first separation zone 170 via conduit 30. First separation zone 170 may include, for example, a flash vessel, distillation columns with from 1 to 15 theoretical plates, a vapor liquid separation device (VLSD), or combinations of two or more thereof. One such VLSD is a cyclonic flash VLSD. The first separation zone removes the vacuum residue, which is collected from conduit 32, from the denitrogenated and desulfurized crude oil, passing the denitrogenated and desulfurized crude oil to the steam cracker 180 through conduit 34. Gases, such as $H_2S$, $NH_3$, and $C_1$-$C_4$ hydrocarbons may also be separated in the first separation zone 170.

Steam cracker 180 breaks down the denitrogenated and desulfurized crude oil into light olefins, pyrolysis gas, $C_5$-$C_9$ hydrocarbons, and PFO by thermally cracking the demetallized, denitrogenated, and desulfurized crude oil using steam in steam cracking furnaces. Additionally, hydrogen gas may be produced during the steam cracking, and this hydrogen gas may be fed to one or both of the hydrotreating reactor 160 via conduit 36 and a hydro-dealkylation and hydro-transalkylation reactor 210 of the hydrocracking unit 140 via conduit 37. In embodiments, steam cracker 180 is a single unit. In other embodiments, steam cracker 180 is composed of multiple units. In embodiments, each of the multiple units may be designed to process materials comprising a specific boiling range (sometimes referred to as a "cut"). As used herein, the term "light olefins" refers to ethylene, propylene, and butylene. The steam cracker 180 may contain multiple zones, such as a convection zone and a pyrolysis zone, and may be operated at an elevated temperature and elevated pressure, both of which may be the same or different in the multiple zones. As used in this context, an "elevated temperature" includes a temperature from 825° C. to 875° C., from 825° C. to 870° C., from 825° C. to 865° C., from 825° C. to 860° C., from 825° C. to 855° C., from 825° C. to 850° C., from 825° C. to 845° C., from 825° C. to 840° C., from 825° C. to 835° C., from 825° C. to 830° C., from 830° C. to 875° C., from 835° C. to 875° C., from 840° C. to 875° C., from 845° C. to 875° C., from 850° C. to 875° C., from 855° C. to 875° C., from 860° C. to 875° C., or even from 865° C. to 875° C. As used in this context, an "elevated pressure" includes a pressure from 100 kPa to 200 kPa, from 100 kPa to 190 kPa, from 100 kPa to 180 kPa, from 100 kPa to 170 kPa, from 100 kPa to 160 kPa, from 100 kPa to 150 kPa, from 100 kPa to 140 kPa, from 100 kPa to 130 kPa, from 100 kPa to 120 kPa, from 100 kPa to 110 kPa, from 110 kPa to 200 kPa, from 120 kPa to 200 kPa, from 130 kPa to 200 kPa, from 140 kPa to 200 kPa, from 150 kPa to 200 kPa, from 160 kPa to 200 kPa, from 170 kPa to 200 kPa, from 180 kPa to 200 kPa, or even from 190 kPa to 200 kPa. In embodiments, this elevated pressure is within the pyrolysis zone. The denitrogenated and desulfurized crude oil may reside in each zone of the steam cracker 180 for a residence time from 0.05 s to 2 s, from 0.05 s to 1.9 s, from 0.05 s to 1.8 s, from 0.05 s to 1.7 s, from 0.05 s to 1.6 s, from 0.05 s to 1.5 s, from 0.05 s to 1.4 s, from 0.05 s to 1.3 s, from 0.05 s to 1.2 s, from 0.05 s to 1.1 s, from 0.05 s to 1 s, from 0.05 s to 0.9 s, from 0.05 s to 0.8 s, from 0.05 s to 0.7 s, from 0.05 s to 0.6 s, from 0.05 s to 0.5 s, from 0.05 s to 0.4 s, from 0.05 s to 0.3 s, from 0.05 s to 0.2 s, from 0.05 s to 0.1, from 0.1 s to 2 s, from 0.2 s to 2 s, from 0.3 s to 2 s, from 0.4 s to 2 s, from 0.5 s to 2 s, from 0.6 s to 2 s, from 0.7 s to 2 s, from 0.8 s to 2 s, from 0.9 s to 2 s, from 1 s to 2 s, from 1.1 s to 2 s, from 1.2 s to 2 s, from 1.3 s to 2 s, from 1.4 s to 2 s, from 1.5 s to 2 s, from 1.6 s to 2 s, from 1.7 s to 2 s, from 1.8 s to 2 s, or even from 1.9 s to 2 s.

Steam may be placed in contact with the denitrogenated and desulfurized crude oil at a steam-to-hydrocarbon ratio (in Lt of steam per Lt of hydrocarbon) in one zone, such as the convection zone, from 0.3 to 2, from 0.3 to 1.9, from 0.3 to 1.8, from 0.3 to 1.7, from 0.3 to 1.6, from 0.3 to 1.5, from 0.3 to 1.4, from 0.3 to 1.3, from 0.3 to 1.2, from 0.3 to 1.1, from 0.3 to 1, from 0.3 to 0.9, from 0.3 to 0.8, from 1 to 2, from 1.1 to 2, from 1.2 to 2, from 1.3 to 2, from 1.4 to 2, or even from 1.5 to 2. In another zone, such as the pyrolysis zone, the steam-to-hydrocarbon ratio may be from 60 to 3000, from 60 to 2500, from 60 to 2000, from 60 to 1500, from 60 to 1000, from 60 to 900, from 60 to 800, from 60 to 700, from 60 to 600, from 60 to 500, from 60 to 400, from 60 to 300, from 60 to 200, from 500 to 3000, from 500 to 2500, from 500 to 2000, from 500 to 1500, from 500 to 1000, from 800 to 3000, from 800 to 2500, from 800 to 2000, from 800 to 1500, from 800 to 1000, from 1000 to 3000, from 1000 to 2500, from 1000 to 2000, or even from 1000 to 1500.

The products of the steam cracking, are then passed to separation zone 170' through conduit 38. Lighter products include $C_1$-$C_{12}$ hydrocarbons. As used herein, the term "heavy products" refers to hydrocarbons having twelve or greater carbon atoms, such as $C_{12}$-$C_{30}$ hydrocarbons, which are also referred to as PFO. Separation zone 170' is used to separate the lighter hydrocarbons, i.e. the $C_1$-$C_{12}$ hydrocarbons, from the PFO. These lighter hydrocarbons may all be collected via one or more conduits 40 for sale or further processing as pyrolysis gas ($C_1$-$C_4$) and pyrolysis gasoline ($C_5$-$C_{12}$). In embodiments, the PFO may be introduced to the catalytic depolyaromatization reactor 110 via conduit 12. In embodiments, first separation zone 170 may separate a quantity of PFO from the denitrogenated and desulfurized crude oil. This PFO may bypass the steam cracker 180 and the second separation zone 170' to be passed directly to the catalytic depolyaromatization reactor 110 via conduit 39. In embodiments, the entire amount of PFO or a portion thereof may optionally be recycled back to the hydrotreating reactor 160 via conduit 41.

As noted above, catalytic depolyaromatization reactor 110 may be in reaction mode or regeneration mode. In the reaction mode, a mixture of the polyaromatics-containing PFO and wash solvent from solvent reservoir 14 is passed over a catalyst composition contained within the catalytic depolyaromatization reactor 110, resulting in depolyaromatized PFO and wash solvent exiting the catalytic depolyaromatization reactor 110 through conduit 56 and polyaromatics adsorbed to the catalyst composition within the catalytic depolyaromatization reactor 110. The mixture of the polyaromatics-containing PFO and wash solvent from solvent reservoir 14 may be added to the catalytic depolyaromatization reactor 10 as individual components, or the mixture may be prepared by adding the wash solvent from the solvent reservoir 14 to the PFO feed through conduit 18'. In the regeneration mode, wash solvent from solvent reservoir 14 without the polyaromatics-containing PFO is added to the catalytic depolyaromatization reactor 110 through conduit 18 and allowed to flow through the catalytic depolyaromatization reactor 110 undergoing regeneration to produce a stream of solvent and polyaromatics, which passes through conduit 20 to condenser 22 and evaporator 24, either sequentially though conduit 25 or to each individually, to separate the solvent from the polyaromatics. The recovered solvent may be sent to the solvent reservoir 14 through conduit 26. The polyaromatics may be sent to the optional residue disposal unit 120 through conduit 28

Optional residue disposal unit 120 is used to dispose of the residue. In embodiments, residue disposal options include, but are not limited to, delayed coking, gasification, and being sent directly to the asphalt pool. Delayed coking, for instance, converts the polyaromatics to coke, which may be collected from conduit 29. As used herein, the term "coke" may refer to one or more of fuel coke, anode coke, and needle coke. The residue disposal unit 120 performing delayed coking thermally cracks the polyaromatics into lower molecular weight hydrocarbons and gases, such as $C_1$-$C_4$ hydrocarbons, $H_2S$, coker naphtha boiling in the range 36° C.-180° C., light coker gas oil boiling in the range 180° C.-370° C., and heavy coker gas oil boiling at and above 370° C., with the residual excess carbon becoming coke. This coke can then be used as an energy source or a carbon source to be used in the manufacture of various products, including synthesis gas, carbon steel, and aluminum carbide.

Figure 2:
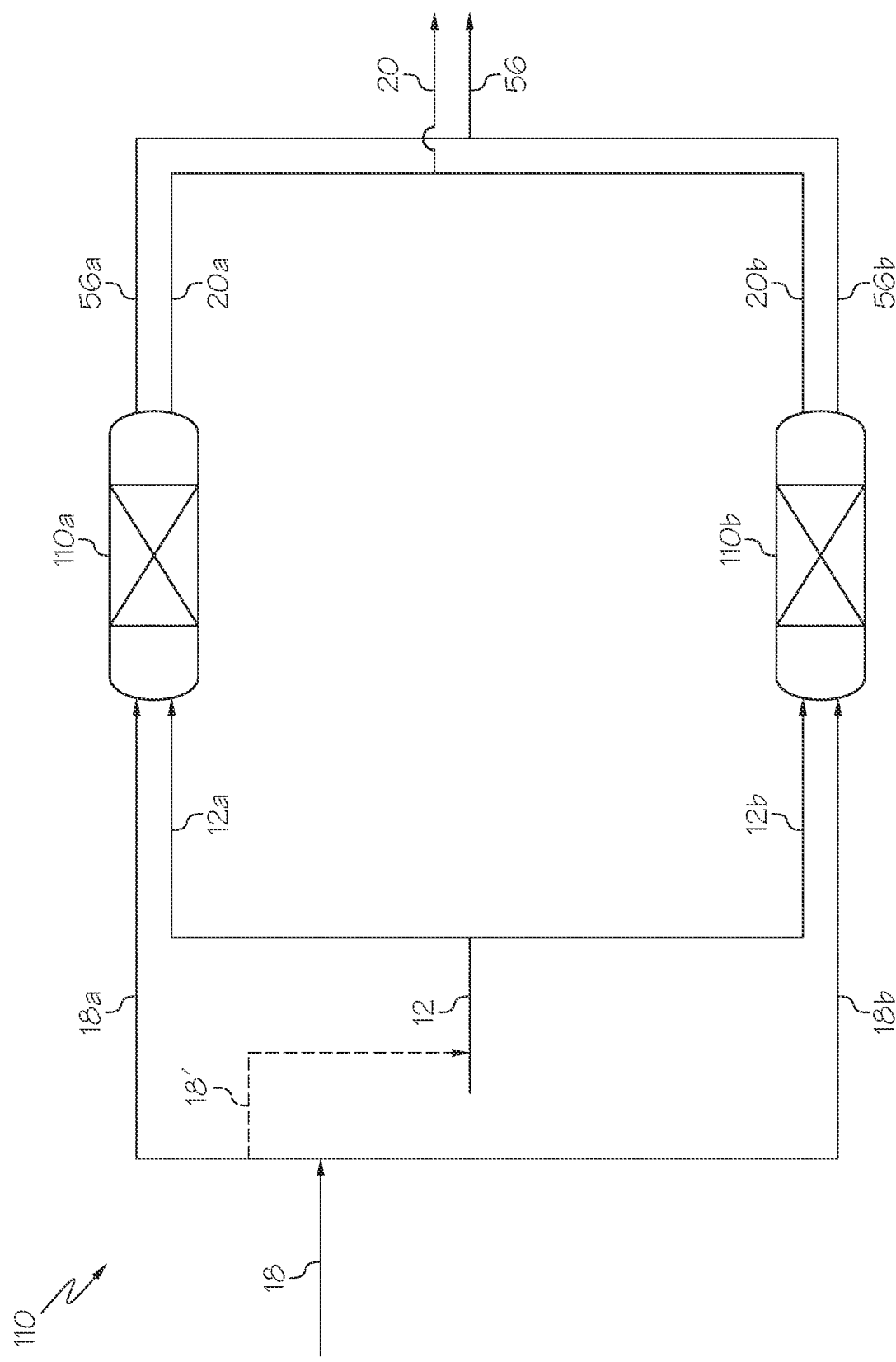
FIG. 2 is a schematic of a catalytic depolyaromatization reactor that includes two reactors according to embodiments described herein.

As shown in FIG. 2, the catalytic depolyaromatization reactor 110 may include a first catalytic depolyaromatization reactor 110a and a second catalytic depolyaromatization reactor 110b. Including at least two catalytic depolyaromatization reactors 110a, 110b allows for continuous operation of at least one catalytic depolyaromatization reactor, even when one catalytic depolyaromatization reactor must be shut down for catalyst regeneration, cleaning, or general maintenance. Conduit 12 may be split into two feed conduits 12a, 12b to feed each of the catalytic depolyaromatization reactors 110a, 110b, respectively. In the reaction mode, a mixture of the polyaromatics-containing PFO and wash solvent from solvent reservoir 14 is passed over the catalyst composition contained within the reactor, resulting in depolyaromatized PFO and wash solvent exiting at least one of the catalytic depolyaromatization reactors 110a, 110b through conduits 56a, 56b and polyaromatics adsorbed to the catalyst composition within the catalytic depolyaromatization reactor 110a, 110b. In the regeneration mode, wash solvent from solvent reservoir 14 without the polyaromatics-containing PFO is added to at least one of the catalytic depolyaromatization reactors 110a, 110b through conduit 18a, 18b and allowed to flow through the catalytic depolyaromatization reactor undergoing regeneration to produce a stream of solvent and polyaromatics. The stream of solvent and polyaromatics passes through conduit 20a, 20b to condenser 22 and evaporator 24, as shown in FIG. 1, to separate the solvent from the polyaromatics. The recovered solvent may be sent to the solvent reservoir 14 through conduit 26. As a result, the wash solvent may be recycled throughout the process. Recycling the wash solvent allows for a significant reduction in the amount of solvent used for the catalytic depolyaromatization process, providing a decreased cost and ecological benefit. The polyaromatics may be sent to residue disposal unit 120 through conduit 28. The conduits 56a, 56b can be combined into the single conduit 56 to provide a single stream of the mixture of depolyaromatized PFO and wash solvent. Similarly, the conduits 20a, 20b can be combined into the single conduit 20 to provide a single stream of the mixture of wash solvent and polyaromatics.

Figure 3:
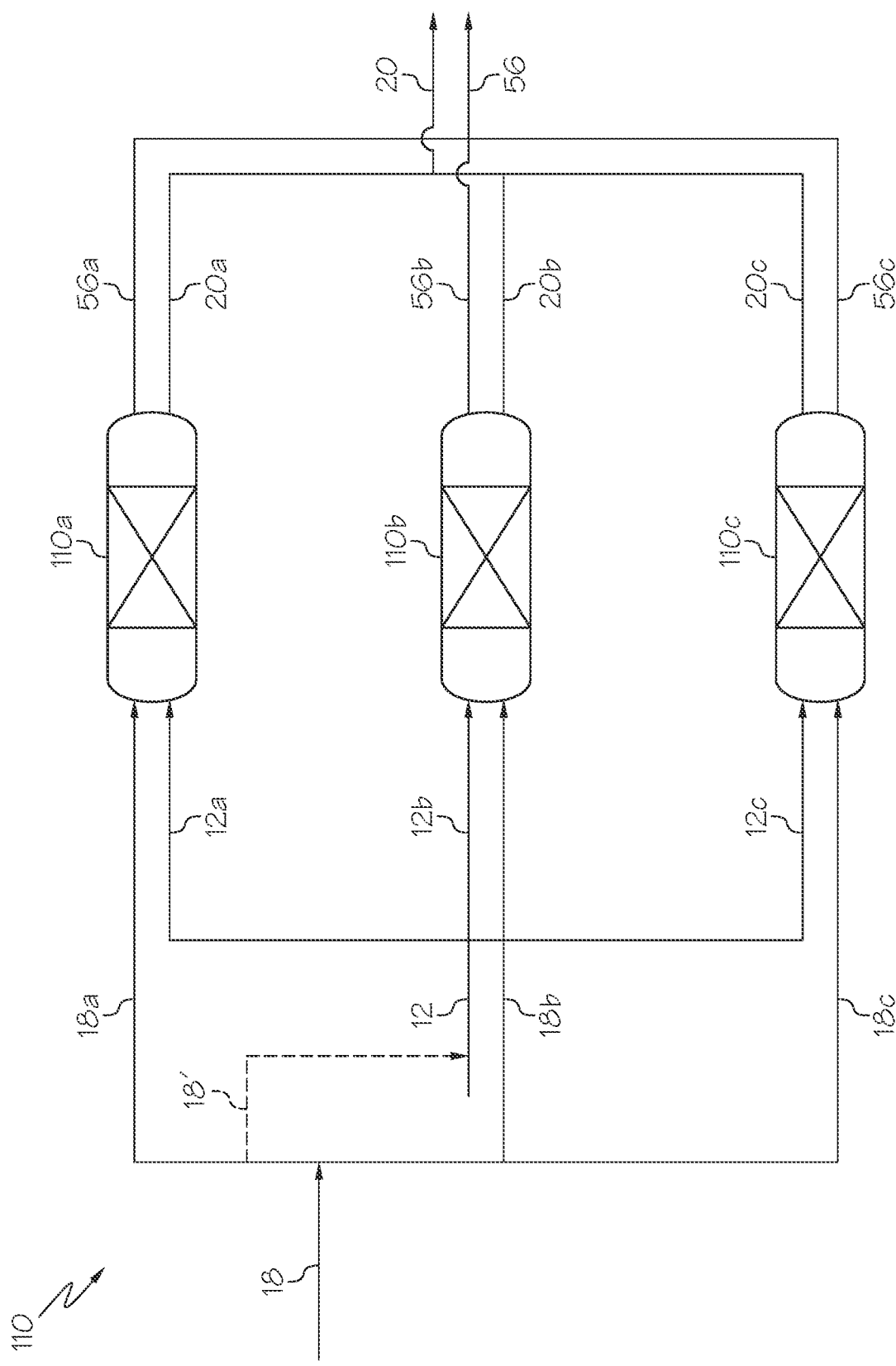
FIG. 3 is a schematic of a catalytic depolyaromatization reactor that includes three reactors according to embodiments described herein.

Referring now to FIG. 3, the catalytic depolyaromatization reactor 110 may include a first catalytic depolyaromatization reactor 110a, a second catalytic depolyaromatization reactor 110b, and a third catalytic depolyaromatization reactor 110c, the operation of which is similar to that of the catalytic depolyaromatization reactors shown in FIG. 2. Conduit 18, which provides wash solvent from solvent reservoir 14, may be divided into three parallel conduits 18a, 18b, 18c. Each of the parallel conduits 18a, 18b, 18c feeds an individual catalytic depolyaromatization reactor 110a, 110b, 110c. Similarly, conduit 12, which provides the PFO or a mixture of the PFO and the wash solvent to the catalytic depolyaromatization reactors 110a, 110b, 110c, may be divided into three parallel conduits 12a, 12b, 12c. Conduit 56, which allows the mixture of depolyaromatized PFO and wash solvent to exit the catalytic depolyaromatization reactors 110a, 110b, 110c, may be divided into three parallel conduits 56a, 56b, 56c. Conduit 20, which allows the mixture of wash solvent and polyaromatics to exit the catalytic depolyaromatization reactors 110a, 110b, 110c, may be divided into three parallel conduits 20a, 20b, 20c, respectively. The conduits 56a, 56b, 56c can be combined into the single conduit 56 to provide a single stream of the mixture of depolyaromatized PFO and wash solvent. Similarly, the conduits 20a, 20b, 20c can be combined into the single conduit 20 to provide a single stream of the mixture of wash solvent and polyaromatics.

Although embodiments having two and three catalytic depolyaromatization reactors 110 are shown in FIGS. 2 and 3, respectively, embodiments having additional catalytic depolyaromatization reactors 110 are envisioned. For instance, alternative embodiments may include four, five, six, seven, eight, nine, or even ten catalytic depolyaromatization reactors 110.

Referring again to FIG. 1, the depolyaromatized PFO exits that catalytic depolyaromatization reactor 110 through conduit 56, which feeds into the hydrocracking unit 140. This hydrocracking unit may include a hydrotreater/hydrocracker 200 and a hydro-dealkylation and hydro-transalkylation reactor 210. Conduit 58 feeds the hydro-dealkylation and hydro-transalkylation reactor 210 from the output of hydrotreater/hydrocracker 200. In the hydrocracking unit 140 the depolyaromatized PFO is hydrotreated and undergoes catalytic hydrocracking, catalytic hydro-dealkylation, and hydro-transalkylation to selectively open aromatics having more than two rings and make BTX. Along with the BTX, the hydrocracking unit 140 also produces LPG and heavy aromatics ($C_9$ and larger aromatics). A separator 190, fed through conduit 44, may be used to separate a BTX-rich stream, LPG, and heavy aromatics from one another. The LPG may be fed back to the steam cracker 180 via conduit 46 and the heavy aromatics may be recycled back to the hydrocracking unit 140 via conduit 48 or collected as fuel oil via conduit 50. The BTX-rich stream may be sent to the BTX complex 150 via conduit 52 for further processing, producing refined BTX, which may be collected via conduit 54.

According to an aspect, either alone or in combination with any other aspect, a catalytic upgrading process for producing petrochemical substances from a crude hydrocarbon stream may include a first catalytic depolyaromatization reactor downstream of a steam cracking unit. The first catalytic depolyaromatization reactor may include a catalyst having a solid heteropolyacid compound. The process may include introducing a feed comprising crude oil to the steam cracking unit, thereby producing pyrolysis fuel oil. Additionally, the process may include introducing the pyrolysis fuel oil to the first catalytic depolyaromatization reactor to remove polyaromatics from the feed, thereby producing polyaromatics adsorbed to the catalyst and depolyaromatized pyrolysis fuel oil having a reduced concentration of polyaromatics. The depolymerized pyrolysis fuel oil may be introduced to a hydrocracking unit, thereby producing a BTX-rich stream and liquid petroleum gas, which may then be separated. The liquid petroleum gas may be introduced to the steam cracking unit, and a wash solvent may be introduced to the first catalytic depolyaromatization reactor after depolyaromatization to remove the polyaromatics. The catalyst in the first catalytic depolyaromatization reactor may thus be regenerated, and a mixture comprising the wash solvent and the polyaromatics may be produced. The wash solvent may be separated from the polyaromatics.

According to a second aspect, either alone or in combination with any other aspect, the first catalytic depolyaromatization reactor may be heated from 60° C. to 100° C. when introducing the pyrolysis fuel oil.

According to a third aspect, either alone or in combination with any other aspect, the reduced concentration of polyaromatics in the depolyaromatized pyrolysis fuel oil may be less than 1% by weight based on the depolyaromatized pyrolysis fuel oil.

According to a fourth aspect, either alone or in combination with any other aspect, the reduced concentration of polyaromatics in the depolyaromatized pyrolysis fuel oil may be from 0.01% by weight of the oil feed to 0.5% by weight based on the depolyaromatized oil.

According to a fifth aspect, either alone or in combination with any other aspect, the wash solvent may be a non-paraffinic solvent.

According to a sixth aspect, either alone or in combination with any other aspect, the wash solvent may comprise an aromatic hydrocarbon solvent.

According to a seventh aspect, either alone or in combination with any other aspect, the wash solvent may be selected from the group consisting of benzene, toluene, xylene, and a mixture of two or more thereof.

According to an eighth aspect, either alone or in combination with any other aspect, the process may further include heating the first catalytic depolyaromatization reactor under a reduced pressure after introducing the wash solvent to the first catalytic depolyaromatization reactor to remove at least 90% by weight of the wash solvent.

According to a ninth aspect, either alone or in combination with any other aspect, the process may further include a second catalytic depolyaromatization reactor arranged in parallel with the first catalytic depolyaromatization reactor and including a catalyst having a solid heteropolyacid compound. Pyrolysis fuel oil may be introduced to the second catalytic depolyaromatization reactor to remove polyaromatics from the pyrolysis fuel oil, thereby producing polyaromatics adsorbed to the catalyst and depolyaromatized pyrolysis fuel oil having a reduced concentration of polyaromatics. The process may further include introducing the wash solvent to the second catalytic depolyaromatization reactor after depolyaromatization to remove the polyaromatics, thereby regenerating the catalyst in the second catalytic depolyaromatization reactor and producing a mixture comprising the wash solvent and the polyaromatics.

According to a tenth aspect, either alone or in combination with any other aspect, introducing the pyrolysis fuel oil to the second catalytic depolyaromatization reactor may occur simultaneously with introducing the wash solvent to the first catalytic depolyaromatization reactor.

According to an eleventh aspect, either alone or in combination with any other aspect, the process may further include a third catalytic depolyaromatization reactor in parallel with the first and second catalytic depolyaromatization reactors and comprising a catalyst having a solid heteropolyacid compound.

According to a twelfth aspect, either alone or in combination with any other aspect, the pyrolysis fuel oil may be introduced to the first and third catalytic depolyaromatization reactors for depolyaromatization simultaneously with introducing wash solvent to the second catalytic depolyaromatization reactor.

According to a thirteenth aspect, either alone or in combination with any other aspect, the solid heteropolyacid compound may be selected from the group consisting of Keggin-type heteropolyacids, cesium substituted heteropolyacids, and combinations thereof.

According to a fourteenth aspect, either alone or in combination with any other aspect, the catalyst may comprise at least one Keggin-type heteropolyacid selected from the group consisting of phosphortungstic heteropolyacid ($H_3PW_{12}O_{40}$), phosphormolybdic heteropolyacid ($H_3PMo_{12}O_{40}$), silicotungstic heteropolyacid ($H_4SiW_{12}O_{40}$), silicomolybdic heteropolyacid ($H_4SiMo_{12}O_{40}$), and combinations thereof.

According to a fifteenth aspect, either alone or in combination with any other aspect, the catalyst may comprise at least one cesium substituted heteropolyacid selected from the group consisting of $Cs_xH_yPMo_{12}O_{40}$, where $0<x<4$ and y equals 3-x; $Cs_xH_yPW_{12}O_{40}$, where $0<x<4$ and y equals 4-x; $Cs_xH_ySiMo_{12}O_{40}$, where $0<x<4$ and y equals 3-x; $Cs_xH_ySiW_{12}O_{40}$, where $0<x<4$ and y equals 4-x; and combinations thereof.

According to a sixteenth aspect, either alone or in combination with any other aspect, the process may further include introducing the polyaromatics to a delayed coking unit, the delayed coking producing coke.

According to a seventeenth aspect, either alone or in combination with any other aspect, the process may further include switching operational modes in the first catalytic depolyaromatization reactor such that the first catalytic depolyaromatization reactor is changed to perform catalyst regeneration.

According to an eighteenth aspect, either alone or in combination with any other aspect, the process may further include a control system which triggers the change in operational modes in the first catalytic depolyaromatization reactor when a level of catalyst deactivation in the first catalytic depolyaromatization reactor exceeds an acceptable level of catalyst deactivation.

According to a nineteenth aspect, either alone or in combination with any other aspect, the process may further include switching operational modes in the second catalytic depolyaromatization reactor such that the second catalytic depolyaromatization reactor is changed to perform depolyaromatization.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

The invention claimed is:

1. A catalytic upgrading process for producing petrochemical substances from a crude hydrocarbon stream, wherein the process comprises a first catalytic depolyaromatization reactor downstream of a steam cracking unit, wherein the first catalytic depolyaromatization reactor comprises a catalyst having a solid heteropolyacid compound, and wherein the process comprises:
   introducing a feed comprising crude oil to the steam cracking unit, wherein the steam cracking produces pyrolysis fuel oil;
   introducing the pyrolysis fuel oil to the first catalytic depolyaromatization reactor to remove polyaromatics from the pyrolysis fuel oil, wherein the depolyaromatization produces polyaromatics adsorbed to the catalyst and depolyaromatized pyrolysis fuel oil having a reduced concentration of polyaromatics;
   introducing the depolyaromatized pyrolysis fuel oil to a hydrocracking unit, wherein the hydrocracking produces a benzene-toluene-xylenes (BTX)-rich stream and liquid petroleum gas;
   separating the BTX-rich stream from the liquid petroleum gas;
   introducing the BTX-rich stream to a BTX complex, wherein the BTX complex produces refined BTX;
   introducing the liquid petroleum gas to the steam cracking unit;
   introducing a wash solvent to the first catalytic depolyaromatization reactor after depolyaromatization to remove the polyaromatics, thereby regenerating the catalyst in the first catalytic depolyaromatization reactor and producing a mixture comprising the wash solvent and the polyaromatics; and
   separating the wash solvent from the polyaromatics.

2. The process of claim 1, wherein the first catalytic depolyaromatization reactor is heated from 60° C. to 100° C. when introducing the pyrolysis fuel oil.

3. The process of claim 1, wherein the reduced concentration of polyaromatics in the depolyaromatized pyrolysis fuel oil is less than 50% by weight based on the depolyaromatized pyrolysis fuel oil.

4. The process of claim 3, wherein the reduced concentration of polyaromatics in the depolyaromatized pyrolysis fuel oil is from 1% by weight to 45% by weight based on the depolyaromatized pyrolysis fuel oil.

5. The process of claim 1, wherein the wash solvent is a non-paraffinic solvent.

6. The process of claim 1, wherein the wash solvent comprises an aromatic hydrocarbon solvent.

7. The process of claim 1, wherein the wash solvent is selected from the group consisting of benzene, toluene, xylene, and a mixture of two or more thereof.

8. The process of claim 1, further comprising heating the first catalytic depolyaromatization reactor under a reduced pressure after introducing the wash solvent to the first catalytic depolyaromatization reactor to remove at least 90% by weight of the wash solvent.

9. The process of claim 1, further comprising a second catalytic depolyaromatization reactor arranged in parallel with the first catalytic depolyaromatization reactor and comprising a catalyst having a solid heteropolyacid compound, the process further comprising:
   introducing the pyrolysis fuel oil to the second catalytic depolyaromatization reactor to remove polyaromatics from the pyrolysis fuel oil, wherein the depolyaromatization produces polyaromatics adsorbed to the catalyst and depolyaromatized pyrolysis fuel oil having a reduced concentration of polyaromatics; and
   introducing the wash solvent to the second catalytic depolyaromatization reactor after depolyaromatization to remove the polyaromatics, thereby regenerating the catalyst in the second catalytic depolyaromatization reactor and producing a mixture comprising the wash solvent and the polyaromatics.

10. The process of claim 9, wherein introducing the pyrolysis fuel oil to the second catalytic depolyaromatization reactor occurs simultaneously with introducing the wash solvent to the first catalytic depolyaromatization reactor.

11. The process of claim 9, further comprising a third catalytic depolyaromatization reactor in parallel with the first and second catalytic depolyaromatization reactors and comprising a catalyst having a solid heteropolyacid compound.

12. The process of claim 11, wherein the pyrolysis fuel oil is introduced to the first and third catalytic depolyaromatization reactors for depolyaromatization simultaneously with introducing wash solvent to the second catalytic depolyaromatization reactor.

13. The process of claim 1, wherein the solid heteropolyacid compound is selected from the group consisting of Keggin-type heteropolyacids, cesium substituted heteropolyacids, and combinations thereof.

14. The process of claim 1, wherein the catalyst comprises at least one Keggin-type heteropolyacid selected from the group consisting of phosphotungstic heteropolyacid ($H_3PW_{12}O_{40}$), phosphomolybdic heteropolyacid ($H_3PMo_{12}O_{40}$), silicotungstic heteropolyacid ($H_4SiW_{12}O_{40}$), silicomolybdic heteropolyacid ($H_4SiMo_{12}O_{40}$), and combinations thereof.

15. The process of claim 13, wherein the catalyst comprises at least one cesium substituted heteropolyacid selected from the group consisting of $Cs_xH_yPMo_{12}O_{40}$, where $0<x<4$ and y equals 3-x; $Cs_xH_yPW_{12}O_{40}$, where $0<x<4$ and y equals 4-x; $Cs_xH_ySiMo_{12}O_{40}$, where $0<x<4$ and y equals 3-x; $Cs_xH_ySiW_{12}O_{40}$, where $0<x<4$ and y equals 4-x; and combinations thereof.

16. The process of claim 1, further comprising introducing the polyaromatics to a delayed coking unit, the delayed coking producing coke.

17. The process of claim 1, further comprising switching operational modes in the first catalytic depolyaromatization reactor such that the first catalytic depolyaromatization reactor is changed to perform catalyst regeneration.

18. The process of claim 17, further comprising a control system which triggers the change in operational modes in the first catalytic depolyaromatization reactor when a level of catalyst deactivation in the first catalytic depolyaromatization reactor exceeds a set level of catalyst deactivation.

19. The process of claim 9, further comprising switching operational modes in the second catalytic depolyaromatization reactor such that the second catalytic depolyaromatization reactor is changed to perform depolyaromatization.

\* \* \* \* \*